Feb. 6, 1962        A. GRAF        3,019,655

DEVICE FOR MEASURING GRAVITY ON MOVING PLATFORMS

Filed May 6, 1957

United States Patent Office 3,019,655
Patented Feb. 6, 1962

3,019,655
DEVICE FOR MEASURING GRAVITY ON MOVING PLATFORMS
Anton Graf, Lochham, near Munich, Germany, assignor to Askania-Werke A.G., Berlin-Friedenau, Germany, a corporation of Germany
Filed May 6, 1957, Ser. No. 657,151
4 Claims. (Cl. 73—382)

This invention relates to a device for measuring gravity on a moving platform and particularly on the high sea.

Pertinent attempts were unsuccessful up to now. While so-called under-water gravimeters are known their use is limited to the vicinity of the coast line and to stationary locations on the bottom of the ocean, where the instrument—in substance a normal gravimeter—is submerged in a pressure resistant vessel. Maritime gravimeters of the pendulum type have been constructed, which can be used on board ships, but their use is slow, each measurement involving hours and the evaluation of the measurements being tedious.

Even the most advanced instrument for present purposes was unsuccessful. It was of the spring suspension type and an attempt was made in it to eliminate horizontal and vertical accelerations, caused by water waves and ship vibrations, from the measuring results, in a simple way, by so mounting the gravimeter mass, fastened to vertical spring means, that it could move only in a vertical direction. While it had been expected that horizontal accelerations would not affect the measurement provided by such a mass, it was determined that, in spite of the guidance of the mass, the spring means was horizontally accelerated by pitch and roll of the vessel. Transverse vibrations of the spring means were the result; the length of the spring means varied periodically; and the mean value of such length, integrated for a period of vibration, was less than the length value at rest. Thus the gravity measurements appeared too small; and the error could not be corrected by recalibrations or the like, because of unpredictable amplitude relations.

It is the object of this invention to provide a gravimeter which is independent of such disturbances and difficulties. This was achieved by a novel combination of features of a measuring system, which as hereinafter shown in greater detail, can be described briefly as providing (a) means for linear-symmetrical indication; (b) a gravimeter mass having a single degree of freedom of movement, in a vertical plane; (c) a horizontal axis torsion spring suspension of the mass and (d) extremely forceful damping of the system.

Figure 1:
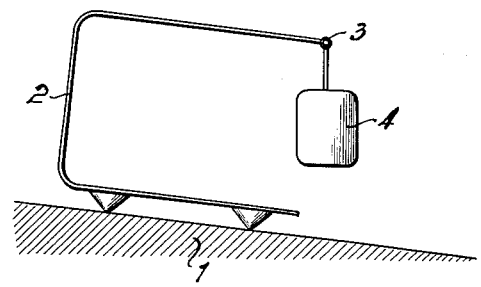
Figure 2:
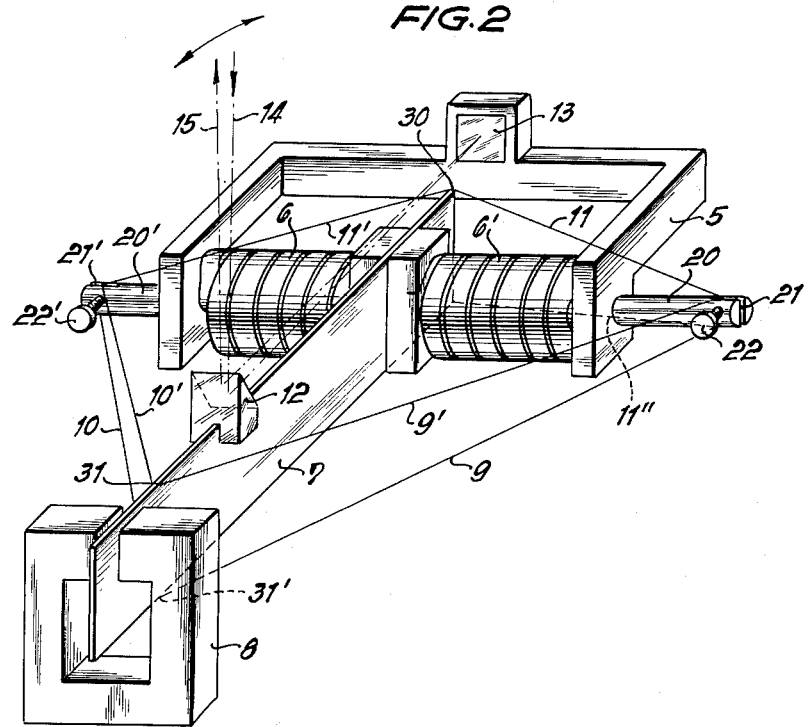

In the drawing, FIGURE 1 is a schematic elevation of apparatus comprising the invention and FIGURE 2 is a perspective view of the principal parts of such apparatus, on a larger scale.

As shown in FIGURE 1 the gravimeter unit 4 is suspended in a universal bearing or gimbal 3. Ball bearings may be used and the arrangement is such that the unit, in case of movements of its mounting platform 1, constantly seeks proper orientation, whether said platform be a ship or an airplane or the like. For this purpose the supporting frame 2 may be associated with means preventing resonant promotion of movements imparted to the gravimeter unit, for instance with the aid of damping vane means immersed in oil, or the like (not shown). A number of known auxiliary means, of secondary importance for this invention, have been omitted for the sake of simplicity and clarity.

The gravimeter system proper, as shown in FIGURE 2, comprises a pair of torsion springs 6 and 6' having horizontal spring axes. These springs 6 and 6' have their free ends fastened to a support system in the form of a yoke 5 and their inner ends fastened to the gravimeter mass 7, with such prestressing that the center of gravity of the mass 7 is kept in a horizontal plane containing the axes of the suspension springs 6 and 6', wherever terrestrial gravity is normal and motion is absent.

In order to eliminate any and all disturbance by horizontal acceleration, the system comprising the horizontally oriented mass and springs is combined with a restraining system providing only a single degree of freedom of movement of the mass relative to the support system, in a vertical plane. The restraining system as shown comprises tension wires 9, 9' holding the front end of mass 7 against horizontal displacement toward the left; similar wires 10, 10' similarly holding it against displacement toward the right; similar wires 11, 11'' similarly holding the rear end of the mass on one side and further similar wires, of which only one—11'—is visible in the drawing, holding the rear end on the other side. The wires 11, 11'', 11' etc. are secured to the rear end part of the gravimeter mass, for instance by welding, soldering or clamping, at a point 30 for wires 11, 11' and a lower point, not visible in the drawing, for wires 11'' etc.; and the wires 9, 9', 10 and 10' are similarly secured to a front end part at points 31, 31'. The free ends of the tension means extend to projections 20, 20' of yoke 5, said projections being provided with slots 21, 21' receiving the tension wires and clamping them with the aid of clamping screws 22, 22'.

It is still possible that vertical accelerations deflect the gravimeter mass from the normal position or movement thereof. In view of this possibility, purely linear deflection over the entire range of accelerations in the vertical plane would be desirable; however, since it is difficult to maintain linearity of deflection upon certain accelerations within the range to be expected in practice, this range has been, in effect, narrowed by providing powerful damping means which greatly reduce the vibrating ability of the measuring system. While this damping can be achieved mechanically or otherwise it is shown as being achieved magnetically; likewise, while the restraining is shown as using mechanical means 9, 9' etc. it could use magnetic or other means. It is important, for best results, that the damping be applied proportionally to the velocity of the moving system; only in that case the mean value of the damped oscillation is independent from the degree of damping applied to the system. Such proportional damping is provided by the magnetic damping means 8.

Thus the accelerations imparted to the gravimeter mounting 2 lead only to vertical accelerations of the gravimeter system proper according to the present invention, and that only subject to extremely forceful damping. The overall result is that only limited, mor or less periodical, vertical movements of the gravimeter mass are likely to occur, which center about the position of the mass properly corresponding with the locally prevailing terrestrial gravity, without falsification by influences such as transverse oscillation of the springs. The said position can be determined readily, the indication of the gravimeter being linear and symmetrical about said position.

The indication is obtained optically, as shown. A light beam 14 is intercepted by a reflector 12 rigidly connected with the gravimeter mass 7 and is further reflected by a stationary mirror 13 which may be mounted on the yoke 5 as shown. The light beam 15 returning from mirror 13 enters via reflector 12 the viewing field of a reading microscope (not shown), wherein the points of reversal of the beam may be compared with a graduated dial. However it may be preferred to automatically record the movements of the gravimeter mass. This can be done direct by photographic or similar recording of the light beam 15, or indirectly by means of a photoelectrical device which responds to the position of the light beam by furnishing a variable current, which in turn governs a recording mechanism. As it is generally sufficient to measure mean values of the oscillations of the mass it is also possible to use various integrating indicators and/or related recorders, for instance for the currents furnished by photoelectrical devices and the like, as mentioned. The integration of the area included in the oscillation curve, over the time coordinate, is possible for instance by means of slow action galvanometers, electro-chemical coulomb meters, precision milliampere second counters and the like. It is believed to be unnecessary to illustrate such known instruments in this application.

The embodiment illustrated and specifically described can be modified in many respects. I claim:

1. A gravimeter comprising in combination a support yoke defining an approximately horizontal axis, subject to displacements of such axis in any of the three dimensions of space when the support yoke is installed on a moving platform such as a ship, an airplane or the like; torsion spring means having one end secured to said support yoke in said axis; a gravimeter mass secured to the other end of said torsion spring means for torsional movement in a plane normal to said axis; a plurality of restraining members, extending from points of said mass lying in said plane, remotely from said axis, to points of said support yoke on opposite sides of and remote from said plane so as to restrain the mass from movements relative to said support yoke other than said torsional movement; and means for strongly damping said torsional movement.

2. A gravimeter as described in claim 1 wherein the restraining members are elongated members tensioned between the mass and the support yoke.

3. A gravimeter as described in claim 1 wherein the damping means comprises magnetic means acting on the mass.

4. A gravimeter comprising, in combination, a support system defining an approximately horizontal axis, subject to displacements of such axis in any of the three dimensions of space when the support system is installed on a moving platform such as a ship, an airplane or the like; torsion spring means having one end secured to said support system in said axis; a gravimeter mass secured to the other end of said torsion spring means for torsional movement in a plane normal to said axis; a plurality of restraining members, extending from points of said mass lying in said plane, remotely from said axis, to points of said support system on opposite sides of and remote from said plane so as to restrain the mass from movements relative to said support system other than said torsional movement; means for damping said torsional movement; and reflector means on the support system and on the gravimeter mass and between which a light beam is reflected to automatically indicate a mean value of the oscillating movements of the mass.

References Cited in the file of this patent

UNITED STATES PATENTS

| | | |
|---|---|---|
| 1,579,273 | Wright | Apr. 6, 1926 |
| 1,900,641 | Gattoni | Mar. 7, 1933 |
| 2,032,381 | Stoutenburgh | Mar. 3, 1936 |
| 2,327,697 | Boucher | Aug. 24, 1943 |
| 2,560,326 | Barry | July 10, 1951 |

FOREIGN PATENTS

| | | |
|---|---|---|
| 1,006,170 | Germany | Apr. 11, 1957 |